United States Patent [19]

Flynn

[11] E Re. 30,169

[45] Reissued Dec. 18, 1979

[54] METHOD OF DRYING COATED WEBS

[76] Inventor: John H. Flynn, 234 Elk Ave., New Rochelle, N.Y. 10802

[21] Appl. No.: 834,506

[22] Filed: Sep. 19, 1977

Related U.S. Patent Documents

Reissue of:

[64] Patent No.: 3,962,213
Issued: Jun. 8, 1976
Appl. No.: 435,851
Filed: Jan. 23, 1974

[51] Int. Cl.[2] ..... B05D 3/08

[52] U.S. Cl. ..... 427/224; 34/23; 427/378; 427/379; 427/388 R

[58] Field of Search ..... 427/224–226, 427/378, 388; 34/23; 118/47

[56] References Cited

U.S. PATENT DOCUMENTS

| | | | |
|---|---|---|---|
| 1,841,485 | 1/1932 | Larsen | 118/47 |
| 1,947,547 | 2/1934 | Fruth | 118/47 |
| 2,838,427 | 6/1958 | Pugh | 118/47 |
| 2,884,705 | 5/1959 | Flynn | 427/224 |
| 3,056,382 | 10/1962 | Glaser et al. | 427/224 |
| 3,131,091 | 4/1964 | Jones | 118/47 |

*Primary Examiner*—Ronald H. Smith
*Assistant Examiner*—Janyce A. Bell
*Attorney, Agent, or Firm*—Michael Ebert

[57] ABSTRACT

Method of drying on a web face an applied coating containing volatile products, involving feeding the web at a rate of at least 50 feet per minute past a station at which a flame sheet from a high-capacity burner is with its tip in contact with the coated face of the fed web transversely thereof for evaporating and igniting the volatile products in the passing coating, and featuring directing into contact with the coated face of the fed web on opposite sides of and adjacent to the contacting flame sheet stable air sheets of a velocity of at least 400 feet per minute.

15 Claims, 6 Drawing Figures

METHOD OF DRYING COATED WEBS

Matter enclosed in heavy brackets [ ] appears in the original patent but forms no part of this reissue specification; matter printed in italics indicates the additions made by reissue.

This invention relates to heat-drying freshly applied coatings on webs in general, and to flame-drying such coatings on moving webs in particular.

The invention is concerned with a method of flame-drying coated webs while traveling at fairly high rates, of which the webs are of paper, plastic or metal, and the coatings are any of various inks or other protective or decorative substances all of which have solvents that evaporate and burn on subjection to flame of sufficiently high temperature. A prior method of this type is disclosed in my earlier U.S. Pat. No. 2,884,705, dated May 5, 1959. This prior method involves feeding a freshly coated web past a drying station at a rate at which an air layer will cling to and travel with the web, and at that station directing a transverse flame sheet with its tip against the coated face of the passing web, with the velocity and tip temperature of the flame sheet being sufficiently high that the latter will strike through the clinging air layer and evaporate and ignite the solvents in the flame-struck coating, and the products thus driven from the coating and ignited are entrapped in the air layer and lifted with the latter from the web face by an air knife downstream from the drying station. While this prior method is generally satisfactory, it was found fairly recently that it did not lend itself to drying particularly on metal webs decorative coatings of required very high uniformity in texture. Thus, the recent drying of overall coatings on metal webs according to according prior method, left the coatings with more or less discernible streaks of random patterns which, while not objectionable for some purposes, are objectionable for other purposes including decorative purposes. The deficiency of the prior method in this respect was traced to flame, easily discernible and obviously not part of the flame sheet, which did streak randomly away from the impinging flame sheet over clinging air layer regions of the coated web face that were definitely remote from ignition proximity to the flame sheet. Quite apparently, burning of at least part of the evaporated volatiles took place in the clinging air layer, and this was recognized as the cause of the objectionable streaks in overall coatings on webs. Of course, burning of at least part of the evaporated volatiles in the clinging air layer occurs also in drying spaced printed ink characters, for example, rather than overall coatings, on webs of paper, plastic or metal, with any adverse effects therefrom on the printed web faces being, however, less noticeable.

It is the primary object of the present invention to devise a method of flame-drying applied coatings on moving webs which is fully as satisfactory as the aforementioned prior method but is devoid of the explained deficiency of the latter.

It is another object of the present invention to devise a method of this type which provides for striking the coated face of the moving web with flame of sufficient velocity and temperature to evaporate and ignite the volatiles in the coating, and which further provides for blocking the escape of any of these volatiles with the traveling web away from the immediate vicinity of the impinging flame sheet in which the latter is effective to flash-evaporate the volatiles in the coating on the passing web face. In thus confining all evaporated volatiles prior to and at any stage of their ignition to the immediate vicinity of the impinging flame sheet, these volatiles are not only blocked from following the traveling web, but they are also kept within close ignition reach of each other and of the flame sheet.

It is a further object of the present invention to devise a method of this type which provides for the aforementioned blocking of any of the volatiles at any stage of their ignition against escape with the traveling web, by maintaining on the coated face of the traveling web a fixed barrier in the form of an air stream or sheet directed against the coated face in the escape path of the driven-off volatiles with the traveling web from the immediate vicinity of the impinging flame sheet, with the drive of the air sheet being sufficient to scatter the air-struck volatiles into most effective ignition dwell with each other and with the impinging flame sheet without, however, interfering with ready escape of the burnt volatiles and products of combustion away from the traveling web.

Another object of the present invention is to devise a method of this type which provides for optimum effectiveness of the impinging flame sheet on all volatiles in the coating on the passing web face for their complete evaporation and ignition locally at and in the immediate vicinity of the impinging flame sheet, by disrupting any clinging air layer on the coated face of the traveling web over a narrow web region which at any instant is struck by the flame sheet and extends beyond the impinging flame sheet to both sides thereof. In thus disrupting over this narrow web region any clinging air layer, the latter is disabled from effectively impeding not only the flame sheet and its heat in their drive into and spread on the passing coating, but also the ensuing flash of the volatiles from the coating, all to the end of bringing the flame sheet and its heat to dwell in most intimate contact with the passing coating for complete evaporation of all volatiles therein and their complete burning within the narrow web region.

A further object of the present invention is to devise a method of this type which provides for the aforementioned disruption over the narrow web region of any clinging air layer on the coated face of the traveling web, by maintaining the aforementioned fixed air barrier on the coated face of the traveling web not only in the escape path of the volatiles from the immediate vicinity of the impinging flame sheet, but also at the traveling web's final approach to the impinging flame sheet. To this end, there are directed two stable air streams or sheets against the coated face of the traveling web on opposite sides of and adjacent to the impinging flame sheet at which the air sheets have no adverse effect on the stability of the flame sheet. Moreover, in order that the disruption of any clinging air layer on the coated face of the traveling web by the air sheets may achieve the aforementioned purpose of bringing the flame sheet and its heat to dwell in most intimate contact with the passing coating for complete evaporation of all volatiles in the coating and their complete burning within a narrow web region, the disruption of the clinging air layer cannot be violent but must be relatively mild, wherefore the velocity of the air sheets, while adequate for their required stability, is considerably less than half of the air knife in the aforementioned prior method which is called upon to lift the clinging air layer clear off the traveling web. Further, the stable air sheets and the rather mild disruption of any clinging air layer over the narrow web range leave at and near the impinging flame sheet and atmospheric zone of relative tranquility rather than disturbing turbulene, which is further conductive to optimum exposure of the coating on the passing web face to the impinging flame sheet and its heat. Moreover, due to optimum exposure in this fashion of the coating on the passing web face to the impinging flame sheet and its heat, the tip temperature of the flame sheet may, for evaporation of all volatiles in the coating and for their complete burning within the narrow web region, advantageously be kept below the required tip temperature of the flame sheet in the aforementioned prior method. Also, and highly important, the air sheets maintain in the narrow web region abundant air for complete burning therein of all evaporated volatiles.

It is another object of the present invention to devise a method of this type which lends itself to drying coatings on webs traveling at widely different speeds, involving the subject of the coated face of the traveling web to one or more tandem flame sheets and associated air sheets, and requiring increasingly higher velocities and tip temperatures of the flame sheets and increasingly higher velocities of the associated air sheets where increasingly higher web speeds call for an increasing number of flame sheets and associated air sheets.

It is further an object of the present invention to devise a method of this type which provides for preferred effective cooling of the high-capacity burner from which the flame sheet emanates, by passing the supply air for the air sheets around and in heat-exchange relation with the burner and leading it on opposite sides of the flame ports in the burner unimpeded and straight into the air sheets at the aforementioned velocity of the latter for maintaining the air sheets stable and directed against the coated face of the traveling web on opposite sides of and adjacent to the impinging flame sheet.

Further objects and advantages will appear to those skilled in the air from the following, considered in conjunction with the accompanying drawings.

In the accompanying drawings, in which certain modes of carrying out the present invention are shown for illustrative purposes:

FIG. 6 is a longitudinal section through, and partial diagrammatic illustration of, an installation in which to clean, coat and dry a continuously moving web in accordance with a method which also embodies the invention.

Figure 1:
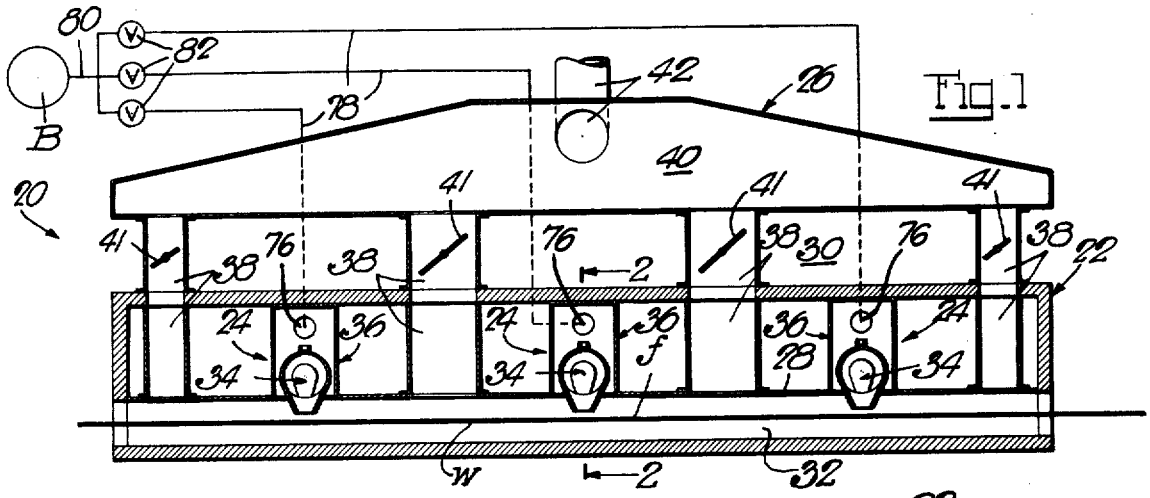
FIG. 1 is a longitudinal section through an installation in which to dry applied coating on a continuously moving web in accordance with a featured method of the invention.

Referring to the drawings, and more particularly to FIG. 1 thereof, the reference numeral 20 designates an installation for drying a freshly applied coating on one face f of a continuously moving web w. The installation 20 has as its major components a longitudinal housing 22, at least one, and in this instance more than one, drying unit 24, and an exhaust system 26.

The housing 22 has a horizontal partition 28 which divides the housing into an upper chamber 30 and a lower tunnel 32 which is open at both ends and through which the moving web w passes. Each drying unit 24 provides a high-capacity gas burner 34 and an air box 36 which will be described in detail hereinafter. The exhaust system 26 provides a plurality of upright conduits 38 and an upper exhaust chamber 40 which through a stack 42 is open to the atmosphere, with the stack 42 preferably having an interposed exhaust fan (not shown). The conduits 38 lead from the tunnel 32 through the upper housing chamber 30 to the exhaust chamber 40, with these conduits 38 being arranged on opposite sides of the drying units 24, and each of these conduits 38 preferably having an interposed regulatable damper 41.

Figure 3:
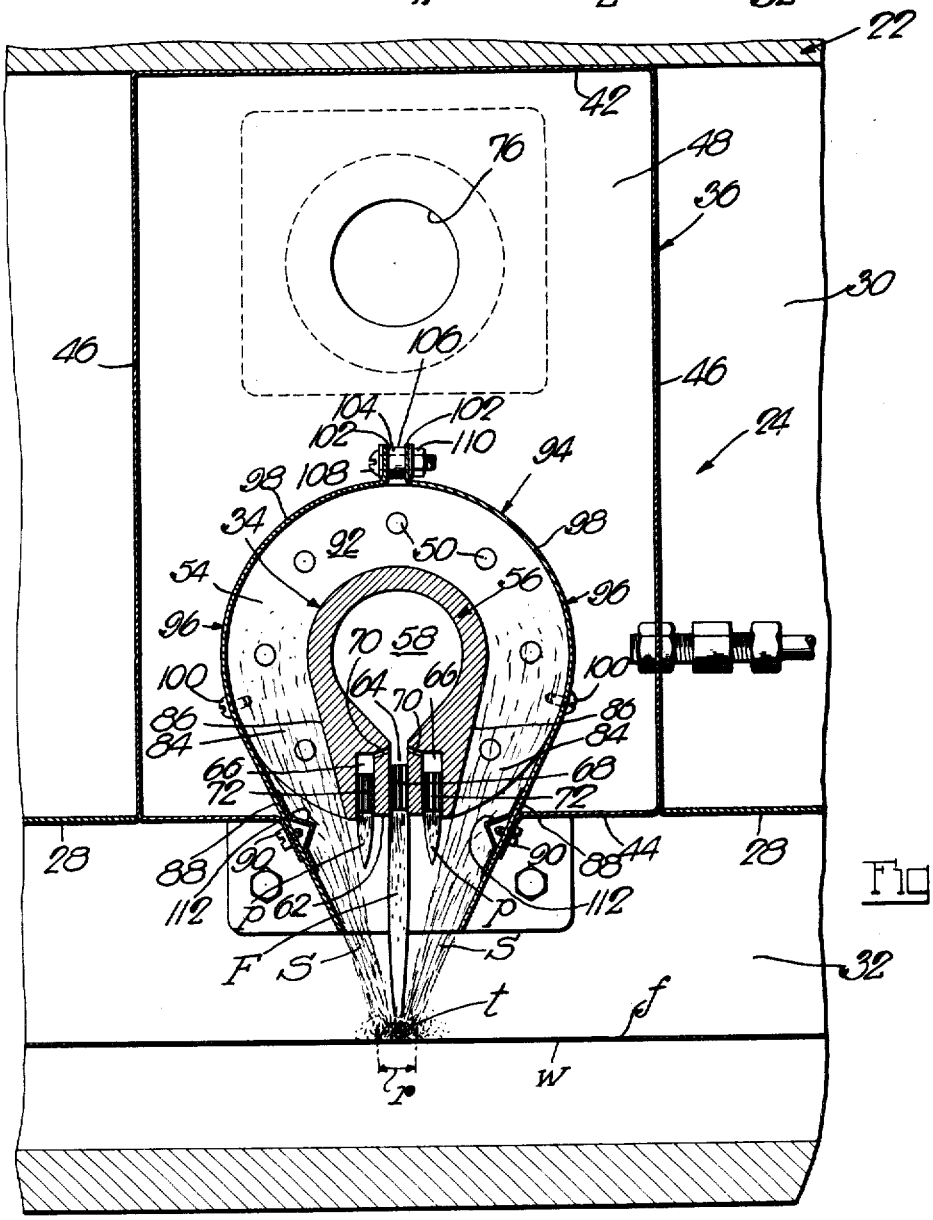
FIG. 3 is another section through the same drying unit taken substantially on the line 3—3 of FIG. 2.
Figure 2:
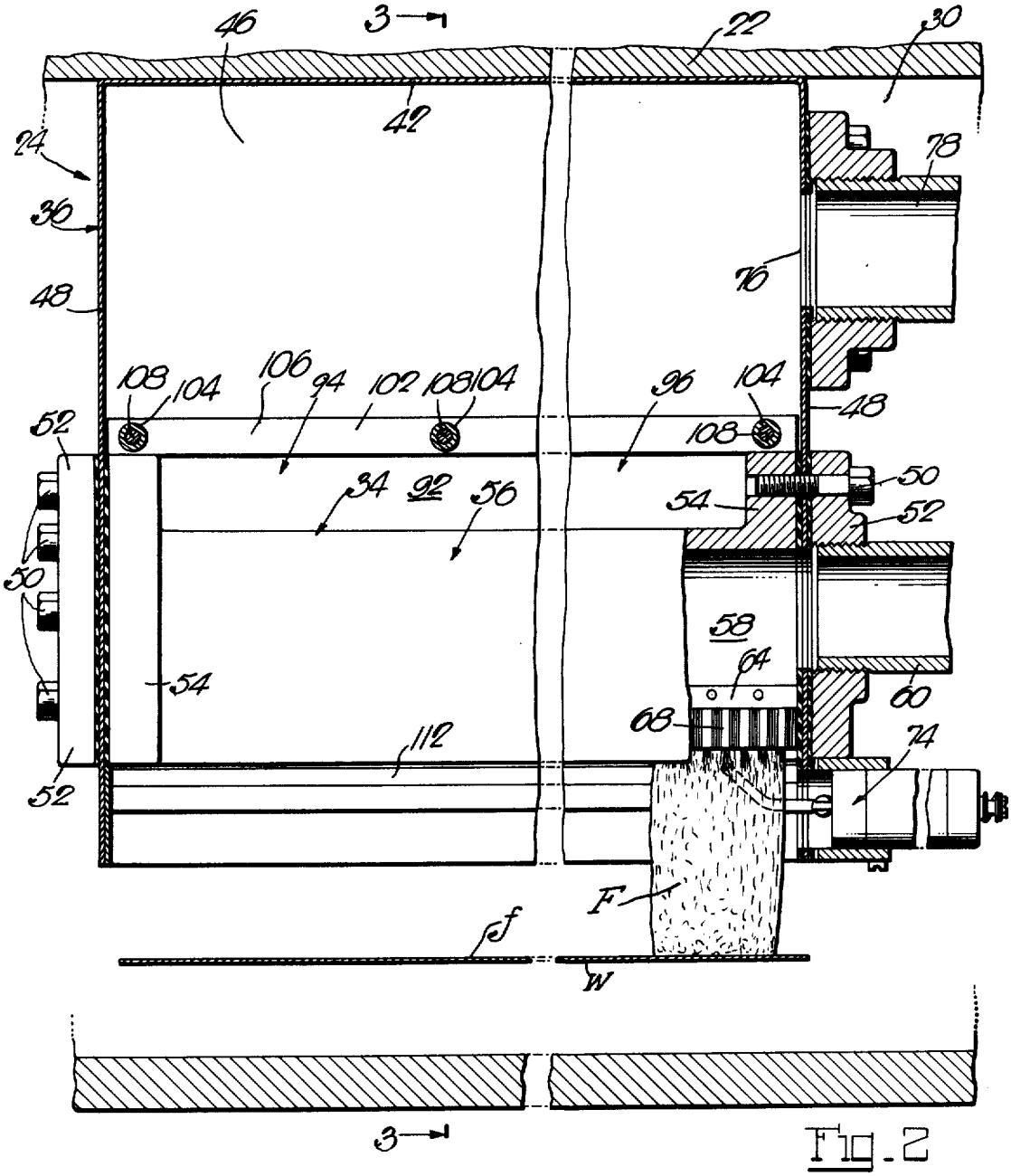
FIG. 2 is an enlarged section through one of the drying units in the installation of FIG. 1.

Since the drying units 24 are in this instance identical in every respect, only one will be described in detail with reference to FIGS. 2 and 3. Thus, the air box 36 is generally rectangular, having top and bottom walls 42 and 44, opposite side walls 46 and opposite end walls 48, with the box 36 being suitably mounted in the upper housing chamber 30, and the bottom wall 44 being in this instance flush with and forming part of the partition 28 (FIGS. 1 and 3). The burner 34 is mounted in the box 36 on the opposite end walls 48 thereof by bolts 50 which pass through end caps 52 on the outside of the end walls 48 and are received in end flanges 54 on the burner casting 56 on the inside of the end walls 48, with one of these end caps, i.e., cap 52', closing the gas compartment 58 in the burner casting 56 at one end, and the other end cap receiving a conduit 60 through which to supply the burner compartment 58 with a combustible air-gas mixture. The burner 34 is of high-capacity type for producing flame of high velocity and high heat output capacity. An example of such a burner is disclosed in U.S. Pat. No. 2,647,569 to John H. Flynn, dated Aug. 4, 1953. For high-capacity performance of the present burner, the burner casing 56 is in its flame surface 62 provided with a main port 64 and flanking auxiliary ports 66, of which the main port 64 is throughout its length in open communication with the gas compartment 58 and receives main-flame burner ribbons 68, while the auxiliary ports 66 are through longitudinally spaced and restricted ducts 70 in communication with the gas compartment 58 and receive pilot-flame burner ribbons 72. Emanating from the main burner ribbons 68 is a flame sheet F which extends transversely of the moving web w and with its tip t strikes against the coated web face f over its entire width (FIG. 2). The flame sheet F is, for its required velocity and heat output, supplied from the gas compartment 58 with a combustible air-gas mixture at a rate greater than the rate of flame propagation, wherefore the flame sheet F could not be maintained without the pilot flames p which emanate from the burner ribbons 72 and are sustained by air-gas mixture at a much lower rate. For starting the flame sheet F, there is provided a conventional ignition electrode unit 74 (FIG. 2).

The air boxes 36 have air inlets 76 which through conduits 78 and 80 are in communication with an air pressure supply, such as the output of a blower B, for example (FIG. 1). Interposed in each conduit 78 is a valve 82 for independent regulation of the volumetric air flow rate to each box 36. The air under pressure constantly admitted to each box 36 is to sustain two stable air streams or sheets S which are directed against the coated face f of the moving web w on opposite sides of and adjacent to the associated flame sheet F at its impingement with the web face f. To this end, each box 36 is provided with two outlets in the form of passages or "nozzles" 84 that lead into the tunnel 32, with each nozzle 84 being in this instance formed by a tapering side 86 of the burners casing 56 and an adjacent inclined baffle 88 which is suitably secured to the interrupted bottom wall 44 of the box, as by screws 90, for example. The nozzles 84 are sufficiently constricted widthwise (FIG. 3) to form well-defined air sheets S which are, moreover, kept at the required stability by the regulated pressure of the air in the box. In this instance also, the inclined baffles 88 extend below the associated burner 34 to extend each nozzle 84 closer to the moving web w and thereby maintain the air sheets S to their impingement with the moving web w at satisfactory stability despite their hereinafter described relatively moderate velocity or drive.

In the present example, the air nozzles 84 are part of a secondary air chamber 92 within each air box 36, with this secondary chamber 92 being formed by the burner casing 56 and a hood 94 partially therearound. The hood 94 is in this instance in two complemental sections 96, with each section 96 providing a part-circular wall 98 and a continuing planar wall in the form of one of the described inclined baffles 88. The hood sections 96 rest with the ends of their part-circular wall parts 98 on the end flanges 54 of the burner casing 56 and are suitably secured thereto as by screws 100, and they are with their inclined baffle parts 88 secured by screws 90 to the bottom wall 44 of the air box 36 as already mentioned. The complemental hood sections 96 are at their tops provided with upright flanges 102 which by a few interposed spacers 104 are held to define a restricted entry slot 106 to the secondary air chamber 92, with the flanges 102 and interposed spacers 104 being locked together by screws 108 and nuts 110. Air under pressure in the box 36 will escape through the restricted slot 106 into the secondary air chamber 92 wherein the air thus admitted at correspondingly high velocity will quickly expand and maintain to and through the nozzles 88 steady air streams at substantially constant velocities which prevail in the air sheets S to their impingement with the moving web w. All of the air thus entering and flowing through the secondary air chamber 92 at any instant is in effective heat-exchange relation with the burner 34 to prevent overheating of the latter at its required high-capacity performance. The provision of the secondary air chamber 92 and its restricted entry slot 106 also makes for maintenance in the box 36 of air from the supplying blower B at a back pressure which is readily controlled by the associated valve 82 (FIG. 1) and which is particularly effective to maintain the air sheets S at a steady and closely regulatable velocity.

As already mentioned, the contemplated flame sheet F must have sufficient heat output capacity and drive or velocity to require sustaining pilot flames p. On the other hand, the air sheets S flank these pilot flames rather closely (FIG. 3), and even though the air sheets have only moderately high velocities specified hereinafter, they tend to create in the vicinity of the pilot flames p a partial vacuum which may extinguish the latter and with it the flame sheet F. To avoid extinction of the pilot flames p and flame sheet F from this cause, there are provided in the hood 94 adjacent and on opposite sides of the flame surface 62 of the burner 34 cam-like baffle formations 112 which divert from the passing air sheets S sufficient air towards the pilot flames p to prevent the formation of any flame-extinguishing vacuum thereat, with these cam-like baffle formations 112 being, however, kept so low as to have no appreciable adverse effect on the drive and stability of the air sheets S.

The installation shown in FIG. 1 is adapted to dry freshly applied coating on a moving or fed web, with the installation providing from one to more than one drying unit 24 depending on the feed rate of the web. The feed rate of the web is usually that at which the coating is applied, and various procedures for applying the same or different coatings permit web feed rates varying over a wide range from about 50 feet per minute to and beyond 2,000 feet per minute. Factors other than the coating applying procedures, such as web texture, different compositions of links or other coating substances, and coating thickness, for example, also enter to some extent into the selection of proper web feed rates.

To demonstrate the function of the drying unit 24, let it be assumed that the installation of FIG. 1 has only one drying unit for performing on a coated paper web w at a feed rate of the same of approximately 400 feet per minute, this being the exemplary feed rate of the paper web at which a coating in the exemplary form of printed matter on the web face f was applied by a printing press ahead of the drying installation. In an actual installation of this type, the flame sheet F was of a length of approximately 2 inches from the flame surface 62 of the burner 34 to its impingement with the passing web w (FIGS. 2 and 3). The heat output and velocity of the flame sheet from the high-capacity burner 34 were regulated in conventional manner, with the velocity of the flame sheet F being kept at approximately 6,000 feet per minute and its tip temperature at its impingement with the web w being kept at approximately 1,340° F. This chosen velocity of the flame sheet F insured intimate contact of the latter with the coated web face f at the given web feed rate, and its chosen tip temperature was sufficiently high to drive the solvents from the passing coating and evaporate and burn them during the exceedingly brief dwell of the coating in the impingement flame sheet F and its heat, yet the flame tip temperature was safely below that at which the paper web would be scorched or even heated beneath its coated face for any appreciable loss in moisture content at the given web feed rate. Furthermore, this chosen tip temperature of the flame sheet is adequate to evaporate and burn solvents of different flash points, such as ketones, acetates, alcohols and hydrocarbons, just to mention a few, and also incinerate nonflammable solvents, in many inks and also other coating substances.

In subjecting the moving web w to the flame sheet F only, i.e., without applying the air sheets S to the passing web, there were noticed flames streaking randomly from the flame sheet impingement area for some distance away from the latter in the travel direction of the web, indicating at least uncontrolled ignition and/or continuing burning of evaporated volatiles along the traveling web, with resulting adverse effects on the dried web being certain though not readily noticeable on the exemplary printed paper web. The moment the air sheets S were applied to the moving web, no such streaking flames were noticed, and all noticeable flame was sharply restricted to the immediate vicinity of the impinging flame sheet, indicating that the ignition and burning of the evaporated solvents was confined to this highly restricted area. Any adverse effects from such streaking flames on the dried web are thus certainly avoided by the air sheets.

In the described exemplary operation on a coated paper web at a feed rate of approximately 400 feet per minute, the velocity of the air sheets S was kept at approximately 900 feet per minute, which is quite considerably lower than the minimum velocity of 5,000 feet per minute of the air knives used in the aforementioned prior drying method which are to drive the entrapped volatiles and also incinerated matter in the clinging air layer on the traveling web away from the latter, yet the air sheets S of much lower velocity avoid travel of the volatiles with the moving web away from the immediate vicinity of the impinging flame sheet F. Accordingly, the air sheets S, which strike against and, therefore, effect any clinging air layer on the passing web face, effectively separate the driven-off volatiles from this clinging air layer. It is known that the air sheets S will not act as the high-velocity air knives in the prior method, but they will even at their much lower velocity disturb or disrupt the air layer on the passing web face sufficiently to permit the driven-off volatiles to scatter locally in close ignition proximity with each other and with the impinging flame sheet. Further, with two air sheets S being directed against the passing web face on both sides of, and in more or less close proximity to, the impinging flame sheet, there is provided on the web face f a narrow but nevertheless distinct region r (FIG. 3) over which the disruption of any air layer on the passing web face prevails and within which the volatiles are free to scatter. Considering the velocity of the air sheets S, which is only moderately high in comparison to that of the air knives in the prior method, it stands to reason that the disruption by the air sheets S of any air layer on the traveling web face over the region r is relatively mild rather than violent, which is conducive to maintaining within this region r an atmospheric zone which is best described as relatively tranquil in contrast to highly tubulent, and in which the coating on the passing web face is subjected to optimum exposure to, and dwell in, the impinging flame sheet and its heat. The relative tranquility of this zone is also indicated by the readily observed high stability, rather than wavering behaviour, of the flame sheet S to its impingement with the passing web face and the relative evenness of flame stemming from the burning of volatiles immediately outside the impinging flame sheet. Another important factor is that the air sheets S supply more than adequate air to the driven-off volatiles for their complete burning within the narrow web region r. On the other hand, the air sheets S do not block free escape of the burnt volatiles and incinerated matter, if any, to an overhead exhaust system with a stack to the atmosphere.

Another important factor noted is that the temperature of the flame sheet F may advantageously be lower than that of the flame sheet in the aforementioned prior method for a comparable operation, but it is not imperative that the temperature of the flame sheet be lower than that of the flame sheet in the prior method, for a flame sheet of a temperature of the prior method will secure the above-described advantages of the flanking air sheets when applied. Thus, while a tip temperature of 1340° F. of the flame sheet in the present installation proved entirely satisfactory, the tip temperature of the flame sheet in the prior method for a comparable operation on a coated web face to dry the coating would have to be at least 1800° F. The permissible lower tip temperature of the flame sheet F in the present installation is attributed to the greater exposure of the passing coating to, and its relatively longer dwell in, the impinging flame sheet and its heat. The permissible lower temperature of the flame sheet secures several advantages. Thus, it makes for less fuel consumption which becomes of increasing importance in today's efforts for fuel conservation. Further, and even more important, the permissible lower flame temperature promises to overcome adverse effects, just now coming to light, which the flame sheet of higher temperature of the prior method apparently has on the dried coatings on webs. Just to mention one of these adverse effects now attributed to the required higher temperature of the flame sheet in the prior method, the flame sheet apparently reacted with solids in the coating so that certain dried coatings turned noticeable dull. Tests to date with a few of these affected coatings have indicated that the lower temperature of the flame sheet apparently reduces, at least, the dulling effect of the flame sheet on these tested coatings.

With the coating on the moving web subjected to, and momentarily dwelling in, the impinging flame sheet of approximately 1340° F. and its heat, and the driven-off volatiles burning completely before passing from the installation, the products reaching the atmosphere certainly do not pollute the latter any more than do combustion and other products from commercial installations which for pollution prevention according to present-day standards are passed through a heated zone of 1500° F. in their escape through a stack. Accordingly, in drying coated webs in the present installation, no such heated stack zone is required with resultant saving of the fairly high cost of maintaining such a heated zone.

The described exemplary operation of the installation is according to a method which embodies the invention, with the method involving feeding a web past a station at a rate of at least 50 feet per minute, supplying a high-capacity burner at this station with a combustible air-gas mixture to sustain a stable flame sheet, and directing the flame sheet substantially with its tip into contact with the coated face of the fed web transversely thereof for evaporating and igniting the volatile products in the passing coating, and the method featuring that improvement which comprises regulating the flame sheet to have a tip temperature of at least 1200° F. and a velocity of at least 1200 feet per minute, and confining the evaporated products to, and completely burning them within, a fixed zone through which the coated face of the fed web passes, by directing against the coated face of the fed web on opposite sides of and adjacent to the contacting flame sheet stable air sheets of a velocity of at least 400 feet per minute.

In the described exemplary operation of the installation with one drying unit 24 the feed rate of the web was approximately 400 feet per minute. It was found that this particular installation lends itself to drying coatings on webs at feed rates within a practical range from approximately 50 feet per minute to approximately 600 feet per minute. However, for most satisfactory drying results within this range, adjustments of the characteristics of the flame sheet are indicated, with such adjustments being readily made from experience and/or checks of just-dried web faces. Thus, increase of the velocity and heat output of the flame sheet is generally indicated at higher web feed rates within the range, for drying coatings with solvents of higher flash points, for drying coatings in which the ratio of volatile to solid components is rather high, for webs of coarser faces, and for coatings of greater thickness, for example. Generally, however, these and also other factors involving adjustment of the characteristics of the flame sheet are satisfactorily dealt with by a flame sheet having tip temperature from about 1200° F. to about 1800° F. and a velocity from about 1200 feet per minute to about 12000 feet per minute.

Insofar as regulation of the velocity of the air sheets S in the use of this installation at web feed rates within the mentioned range is concerned, the most reliable and easiest control thereover is to regulate their velocity from ready observation of the flame on the coated web face by setting their velocity near a point at which readily perceptible random streaking of flame with the traveling web away from the impinging flame sheet disappears. Nevertheless, as a guide to regulation of the velocity of the air sheets S for reliable operation of the installation at web feed rates within the given range, a generally satisfactory velocity of the air sheets will be within a range from approximately 400 feet per minute to approximately 1200 feet per minute.

It stands to reason that at web feed rates in excess of the above range, the velocity and heat output of the flame sheet would have to be increased still further in order to have a drying effect on the web coatings. However, there are several factors which make it impractical to rely on a single flame sheet for drying coatings on webs at such higher feed rates. Thus, at web feed rates beyond, and particularly considerably beyond, 600 feet per minute, the air layer on the traveling web becomes heavier and interferes more and more with penetration of the impinging flame into, and spread of its heat on, the coating on the passing web face, and the dwell of a passing coating in the impinging flame and its heat, exceeding brief as it is even within a web feed range from 50 to 600 feet per minute, becomes critically brief and rapidly far too brief for any drying effect from a single flame sheet on the coating on a passing web face. Further, even if it were attempted to increase the velocity and heat output of a single flame sheet to compensate for these adverse factors to drying, there would be real danger of at least scorching the web. Therefore, the answer to reliable drying of coatings on webs at web feed rates beyond the above range is drying in stages, involving more than one drying unit in tandem for drying the coatings progressively.

In this connection, it has been found that an installation with two drying units 24 in succession lends itself quite nicely to drying coatings on web faces at web feed rates within a range from about 600 feet per minute to about 1200 feet per minute. In general, it has been found in an installation with two drying units, and it is given as a guide, to keep the tip temperature of each flame sheet within a range from about 1300° F. to about 1900° F., and its velocity within a range from about 2000 feet per minute to about 16000 feet per minute, and to keep the velocity of the air sheets within a range from about 400 feet per minute to about 1600 feet per minute. Accordingly, the invention also features a method of drying applied coatings on webs fed at a rate within a range from about 600 feet per minute to about 1200 feet per minute, with the method being like the earlier described method, except that two high-capacity burners at successive stations are supplied with combustible air-gas mixture.

The installation of FIG. 1 with three successive drying units 24 lends itself to reliable drying of coatings on faces of webs fed at rates within a range from about 1200 feet per minute to about 1600 feet per minute. For successful operation of this installation, the same is operated according to the same general method, except that three high-capacity burners at successive stations are supplied with combustible air-gas mixture. The flame sheet from each burner may be regulated to have a tip temperature from about 1300° F. to about 1900° F. and a velocity from about 3000 feet per minute to about 18000 feet per minute, and the air sheets associated with each flame sheet may be regulated to have velocity from about 600 feet per minute to about 1600 feet per minute.

The installation of FIG. 1 may also provide four successive drying units 24 to thereby lend itself to reliable drying of coatings on faces of webs fed at rates within a range from about 1600 feet per minute to about 2000 feet per minute. For successful operation of this installation, the same is operated in accordance with the same general method, except that four high-capacity burners at successive stations are supplied with combustible air-gas mixture. The flame sheet from each burner may be regulated to have a tip temperature from about 1300° F. to about 2000° F. and a velocity from about 3000 feet per minute to about 19000 feet per minute, and the air sheets associated with each flame sheet may be regulated to have a velocity from about 600 feet per minute to about 1700 feet per minute. At as yet unexplored web feed rates of over 2000 feet per minute, an installation operated according to the featured method is fully expected reliably to dry coatings on webs, though this may involve still another or even more additional drying units.

In installations using more than one drying unit, the spacing of successive drying units is not critical and may largely be left to practical considerations for the installation.

Figure 4:
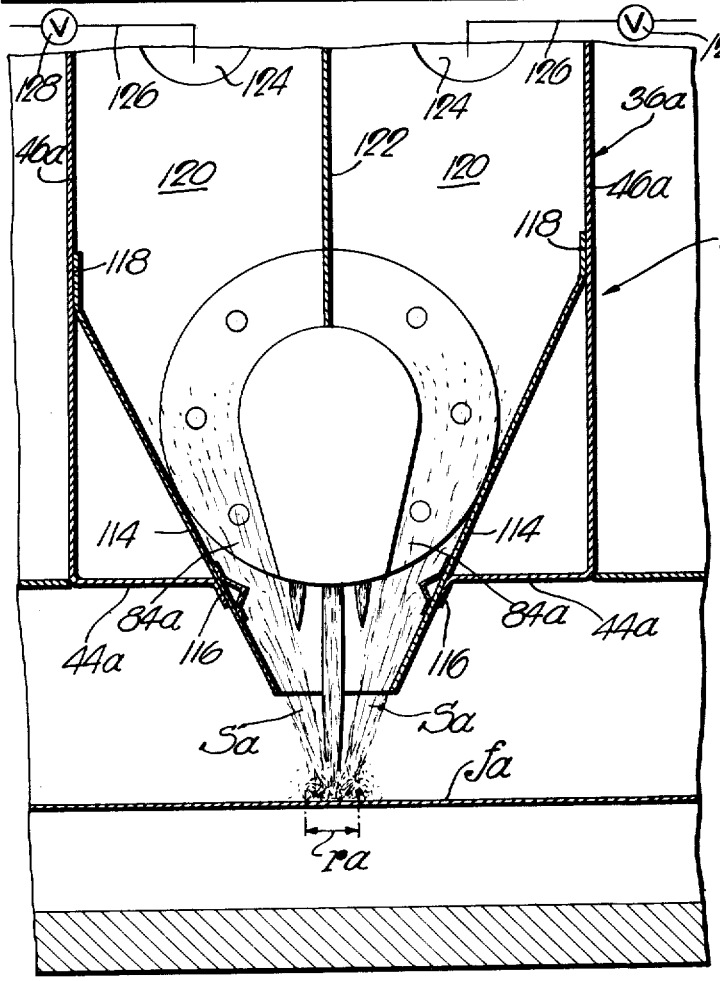
Figure 5:
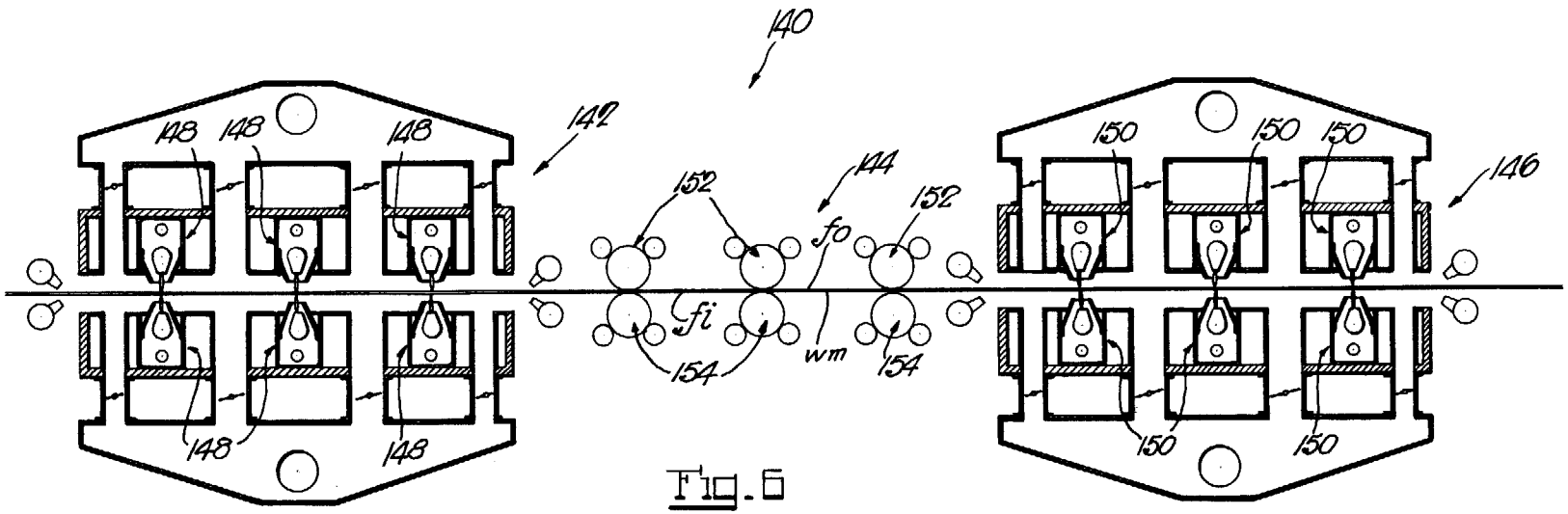

While in the described installation the air box 36 of each drying unit 24 is provided with a secondary chamber 92 around the associated burner 34, it is also feasible to use the modified drying unit 24a of FIG. 4 which provides an air box 36a that lacks a secondary chamber. Thus, the air nozzles 84a lead directly from the air box 36a, and their outer walls are formed by inclined baffles 114 which at 116 and 118 are mounted on the bottom wall 44a and on the side walls 46a of the air box.

The drying unit of FIG. 4 shows another modification whereby the velocities of the air sheets Sa are individually regulatable for their contribution in establishing over the narrow web region ra atmospheric conditions which are most favorable for evaporation of all volatiles in the coating on the passing web face fa and their complete burning within the web region ra, with such most favorable atmospheric conditions being gaugable from observation of the flame pattern and behaviour within the web region ra. To this end, the air box 36a is divided into separate compartments 120 by a partition 122, with each compartment 120 having an air inlet 124 which through a conduit 126 is in communication with the output of a blower (not shown), and each conduit 126 being provided with an interposed regulatable valve 128.

Figure 5:
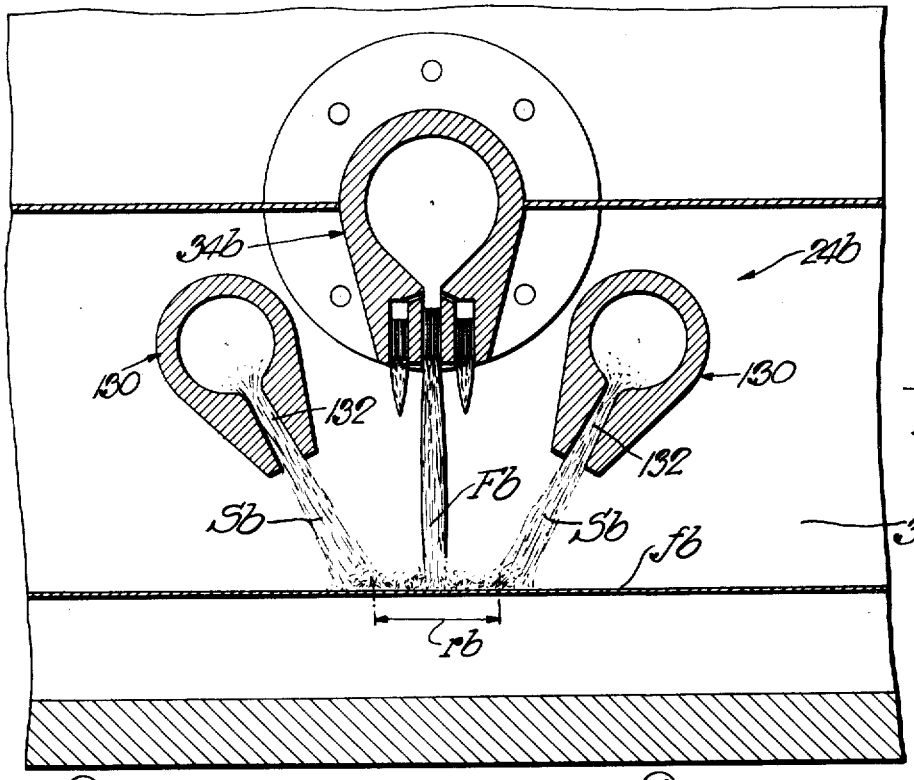
FIGS. 4 and 5 are fragmentary sections through differently modified drying units, respectively.

While each of the described drying units 24 and 24a provides an air box which together with the associated burner forms the nozzles for the air sheets, FIG. 5 shows a further modified drying unit 24b which is devoid of an air box and has in lieu thereof air manifolds 130 on opposite sides of the burner 34b. These manifolds 130, which are suitable mounted in the tunnel 32b of the installation, are supplied with air under regulatable compression similarly as the air boxes of the drying units 24 and 24a, and they are provided with nozzles 132 from which issue air sheets Sb at velocities like or similar to those of the air sheets in the drying units 24 and 24a. This particular drying unit 24b has been used in drying coatings on the faces of the fed webs and has been found entirely satisfactory. It will be noted that in this drying unit 24b the air sheets Sb impinge on the passing web face fb on opposite sides of, but at a distance from, the impinging flame sheet Fb. Given by way of example only, this distance was approximately one-quarter inch in the installation in which the drying unit 24b was used successfully. Successful operation of this particular unit 24b does indicate that the air sheets may at their impingement with the moving web be spaced from the impinging flame sheet, but such spacing must necessarily be well within one inch in order substantially to duplicate the before-described atmospheric conditions over a relatively narrow web region rb for evaporation of all volatiles in the coating on the passing web face and their complete burning within this web region.

In contrast to the air sheets Sb in the drying unit 24b, the air sheets in the drying units 24 and 24a are in contact, more or less, with the associated flame sheet, but only at its impingement with the passing web. Keeping the air sheets in such contact with or spaced from the associated flame sheet at its impingement with a passing web are thus alternatives in the featured method of the invention.

Coatings on moving webs of paper, plastic or metal are successfully dried according to the featured method of the invention. Of course, drying of such coatings is of practical consequence only if the applied coating will adhere or "stick" to the web. Thus, firm adherence of a coating on a web face requires in any event a web face which is clean, i.e., is without superposed matter that would interfere with adhesion of an applied coating to the web face. While the faces of paper and also plastic webs as produced are generally clean in this respect, this is not the case with metal webs as produced. Thus, metal webs or sheets, such as aluminum, tin-coated or chrome-coated steel or plain steel, for example, which are to be coated and fabricated into different products, such as panels or cans, for instance, have on their faces contaminants in the forms of lubricant customarily applied in a rolling mill at the time these webs or sheets are rolled to a specified thickness. The faces of metal webs or sheets thus contaminated with lubricant will not accept an applied coating, wherefore it is necessary to first clean these faces which to this day is done by washing them with detergents. Cleaning the faces of metal webs in this fashion is at best a time-consuming operation, but even more important, it has to this day prevented the highly desirable direct coating of a metal web especially in large coil form, as received from the mill, in a single pass through a coating application installation.

In dealing with the featured drying method of the invention, it was found that the same adapts itself also to flame-cleaning the contaminated faces of metal webs in motion, and particularly on their single pass to and through a coating application station and a succeeding drying station. FIG. 6 shows an installation 140 which in its major operating components, i.e., the cleaning component 142, the coating application component 144 and the drying component 146, is similar to corresponding operating components of an actual test installation in which metal webs fed at approximately 125 feet per minute were successfully cleaned, coated and dried, all in a single pass of the web. In keeping with the relatively low web feed rate of approximately 125 feet per minute, the test installation had only one cleaning unit 148 in its cleaning component and only one drying unit 150 in its drying component. In this test installation, the cleaning unit was structurally identical with the drying unit, each having a high-capacity burner and an air box with nozzles for directing air sheets against the passing web on opposite sides of and adjacent to the impinging flame sheet. In operating the test installation, the velocity and tip temperature of the flame sheet and the velocity of the associated air sheets from the drying unit were kept approximately the same as for drying coatings on paper webs, for example, and the velocity and tip temperature of the flame sheet and the velocity of the associated air sheets from the cleaning unit were kept approximately the same as those of the flame sheet and air sheets from the drying unit. Accordingly, a metal web will be cleaned as long as the velocity and tip temperature of the flame sheet and the velocity of the associated air sheets of a cleaning unit are kept approximately the same as those of the flame sheet and associated air sheets from a drying unit within the ranges prescribed by the featured method for web feed rates within the also prescribed ranges.

In the exemplary installation 140 of FIG. 6, a metal web wm is in this instance adapted for subsequent blanking into can bodies with an interior protective liner and an outer decorative, including print, coating of exemplary three colors. To this end, the coating application component 144 provides three roll-on applicators 152 for applying the 3-color decorative coating to the face fo of the web wm, and further provides preferably more than one roll-on applicator 154 for applying the liner coating on the opposite face fi of the web wm. In keeping with the exemplary coating of both faces of the web, the cleaning component 142 and the drying component 146 are provided with cleaning and drying units 148 and 150, respectively, on both sides of the web. The drying component 146 provides in this instance three pairs of successive drying units 150 to cope with a higher web feed rate, and the cleaning component provides the same number of pairs of cleaning units 148.

Cleaning, coating and drying of a metal web in motion is according to an also featured method of the invention, which comprises feeding a metal web with lubricant-contaminated faces through successive first, second and third stations at a rate of at least 50 feet per minute, at said second station applying to at least one face of the passing web a coating containing volatile products, supplying a high-capacity burner at each of said first and third stations with a combustible air-gas mixture to sustain a stable flame sheet and directing the latter substantially with its tip into contact with said one face of the passing web transversely thereof, regulating the flame sheet at each of said first and third stations to have a tip temperature of at least 1200° F. and a velocity of at least 1200 feet per minute for evaporating and igniting the lubricant contaminant and evaporating and igniting the volatile products in the coating, respectively, on said one web face, and confining the evaporated products to, and completely burning them within, fixed zones at said first and third stations through which said one web face passes, by directing into contact with said one face of the fed web at opposite sides of and adjacent to the contacting flame sheet at each of said first and third stations stable air sheets of a velocity of at least 400 feet per minute.

The present invention also encompasses the method of cleaning one or both lubricant-contaminated faces of a metal web while being fed, without subsequently coating the metal web and drying the coating.

What is claimed is:

1. A method of drying on a web face an applied coating containing volatile products, which comprises feeding the web past a station at a rate of at least 50 feet per minute, supplying a high-capacity burner at said station with a combustible air-gas mixture to sustain a stable flame sheet and directing the flame sheet substantially with its tip into contact with the coated face of the fed web transversely thereof for evaporating and igniting the volatile products in the passing coating, and confining the evaporated products to, and completely burning them within a fixed zone through which the coated face of the fed web passes, by directing into contact with the coated face of the fed web on opposite sides of and at a spacing from zero to less than 1 inch from the contacting flame sheet, stable air sheets of a velocity within a range from about 400 feet per minute to about 1700 feet per minute.

2. The drying method of claim 1, which further comprises regulating the flame sheet to have a tip temperature of at least 1200° F. and a velocity of at least 1200 feet per minute.

3. The drying method of claim 1, in which the air sheets are directed to contact the flame sheet substantially only at its impingement with the coated web face.

4. The drying method of claim 1, in which the air sheets are directed to remain out of contact with the flame sheet a distance of less than 1 inch from its contact with the web.

5. The drying method of claim 1, in which the air sheets are inclined to the flame sheet to approach it and contact it substantially only at its impingement with the coated web face.

6. The drying method of claim 1, in which the velocities of the air sheets on opposite sides of the contacting flame sheet are independently regulatable.

7. A method of drying on a web face an applied coating containing volatile products, which comprises feeding the web past a station, supplying a high-capacity burner at said station with a combustible air-gas mixture to sustain a stable flame sheet and directing the flame sheet substantially with its tip into contact with the coated face of the fed web transversely thereof, with the temperature of the flame sheet being sufficient to evaporate and ignite the volatile products in the passing coating into observable flame, directing stable air sheets into contact with the coated face of the fed web on opposite sides of the contacting flame sheet and at a spacing from the latter from zero to less than 1 inch, and confining the evaporated products to, and completely burning them within, a fixed zone on the coated web face between and including the contact areas of the air sheets on the coated web face, by regulating the air sheets within a velocity range from about 400 feet per minute to about 1700 feet per minute to a velocity at which random streaking of flame in web feed direction out of and away from said zone is no longer observable.

8. A method of drying on a web face an applied coating containing volatile products, which comprises feeding the web past a station at a rate within a range from approximately 50 feet per minute to approximately 600 feet per minute, supplying a single high-capacity flame burner at said station with a combustible air-gas mixture to sustain a stable flame sheet, and directing the flame sheet substantially with its tip into contact with the coated face of the fed web transversely thereof, maintaining the flame sheet at a tip temperature from about 1200° F. to about 1800° F. and a velocity from about 1200 to about 12000 feet per minute for evaporation and ignition of the volatile products in the passing coating by the flame sheet, and confining the evaporated products to, and completely burning them within, a fixed zone through which the coated face of the fed web passes, by directing stable air sheets of a velocity from about 400 to about 1200 feet per minute into contact with the coated face of the fed web on opposite sides of the contacting flame sheet at a spacing from the latter from zero to less than 1 inch.

9. A method of drying on a web face an applied coating containing volatile products, which comprises feeding the web past two successive stations at a rate within a range from approximately 600 feet per minute to approximately 1200 feet per minute, supplying two high-capacity burners, one at each station, with a combustible air-gas mixture to sustain a stable flame sheet from each burner, and directing each flame sheet substantially with its tip into contact with the coated face of the fed web transversely thereof, maintaining each flame sheet at a tip temperature from about 1300° F. to about 1900° F. and a velocity from about 2000 to about 16000 feet per minute for evaporation and ignition of volatile products in the passing coating by the flame sheet, and confining the evaporated products to, and completely burning them within, a fixed zone at each station through which the coated face of the fed web passes, by directing stable air sheets of a velocity from about 400 to about 1600 feet per minute into contact with the coated face of the fed web on opposite sides of each contacting flame sheet at a spacing from the latter from zero to less than 1 inch.

10. A method of drying on a web face an applied coating containing volatile products, which comprises feeding the web past three successive stations at a rate within a range from approximately 1200 feet per minute to approximately 1600 feet per minute, supplying three high-capacity burners, one at each station, with a combustible air-gas mixture to sustain a stable flame sheet from each burner, and directing each flame sheet substantially with its tip into contact with the coated face of the fed web transversely thereof, maintaining each flame sheet at a tip temperature from about 1300° F. to about 1900° F. and a velocity from about 3000 to about 18000 feet per minute for evaporation and ignition of volatile products in the passing coating by the flame sheet, and confining the evaporated products to, and completely burning them within, a fixed zone at each station through which the coated face of the fed web passes, by directing stable air sheets of a velocity from about 600 to about 1600 feet per minute into contact with the coated face of the fed web on opposite sides of each contacting flame sheet at a spacing from the latter from zero to less than 1 inch.

11. A method of drying on a web face an applied coating containing volatile products, which comprises feeding the web past four successive stations at a rate within a range from approximately 1600 feet per minute to approximately 2000 feet per minute, supplying four high-capacity burners, one at each station, with a combustible air-gas mixture to sustain a stable sheet from each burner, and directing each flame sheet substantially with its tip into contact with the coated face of the fed web transversely thereof, maintaining each flame sheet at a tip temperature from about 1300° F. to about 2000° F. and a velocity from about 3000 to about 19000 feet per minute for evaporation and ignition of volatile products in the passing coating by the flame sheet, and confining the evaporated products to, and completely burning them within, a fixed zone at each station through which the coated face of the fed web passes, by directing stable air sheets of a velocity from about 600 to about 1700 feet per minute into contact with the coated face of the fed web on opposite sides of each contacting flame sheet at a spacing from the latter from zero to less than 1 inch.

12. Method of applying and drying a coating on a metal web, which comprises feeding a metal web with lubricant contaminated faces through successive first, second and third stations at a rate of at least 50 feet per minute, at said second station supplying to at least one face of the passing web a coating containing volatile products, supplying a high-capacity burner at each of said first and third stations with a combustible air-gas mixture to sustain a stable flame sheet and directing the latter substantially with its tip into contact with said one face of the passing web transversely thereof, regulating the flame sheet at each of said first and third stations to have a tip temperature of at least 1200° F. and a velocity of at least 1200 feet per minute for evaporating and igniting the lubricant contaminant and evaporating and igniting the volatile products in the coating, respectively, on said one web face, and confining the evaporaed products to, and completely burning them within, fixed zones at said first and third stations through which said one face of the fed web passes, by directing stable air sheets of a velocity within a range from about 400 feet per minute to about 1700 feet per minute into contact with said one face of the fed web at opposite sides of the contacting flame sheet at each of said first and third stations at a spacing from the respective contacting flame sheet from zero to less than 1 inch.

13. A method of cleaning a lubricant-contaminated face of a metal web, which comprises feeding a metal web past a station at a rate of at least 50 feet per minute, supplying a high-capacity burner at said station with a combustible air-gas mixture to sustain a stable flame sheet and directing the latter substantially with its tip into contact with said contaminated face of the passing web transversely thereof for evaporating and igniting the lubricant contaminant, and confining the evaporated products to, and completely burning them within, a fixed zone through which said face of the web passes, by directing stable air sheets of a velocity within a range from about 400 feet per minute to about 1700 feet per minute into contact with said face of the fed web at opposite sides of the contacting flame sheet at a spacing from the latter from zero to less than 1 inch.

14. The cleaning method of claim 13, which further comprises regulating the flame sheet to have a tip temperature of at least 1200° F. and velocity of at least 1200 feet per minute.

*15. The method of drying a volatile wet coating on the surface of a body moving past a station, said method comprising the steps of:*

*(A) directing a sheet of flame toward said body to cause the tip of the flame to impinge on a zone across said wet coating to evaporate the volatiles of said coating; and*

*(B) directing two sheets of air at high velocity toward said body on opposite sides of the sheet of flame to cause the air sheets to impinge on said wet coating on either side of said zone to substantially restrict the action of said flame to said zone.*

* * * * *